3,024,213
HEAT-DRY PRINTING INK VEHICLE
Thomas B. Ludlow, St. Paul, Minn., assignor to Bemis Bro. Bag Company, Minneapolis, Minn., a corporation of Missouri
No Drawing. Filed Apr. 20, 1959, Ser. No. 807,291
5 Claims. (Cl. 260—23)

This invention relates to heat-dry printing ink vehicles and inks. More particularly, this invention provides a heat-drying ink vehicle based on finely divided polyvinyl chloride resins dispersed in liquid plasticizers and useful in applications where heretofore oil-type ink vehicles have been used.

By "oil-type" I refer to inks generally having a viscosity greater than about 2000 cps. including an oleoresinous varnish, and being suitable to printing on conventional offset or letterpress equipment, or modifications thereof. The ink vehicle herein described makes possible an improved heat-dry ink which is primarily useful for typographic printing, but may also be formulated for wet offset (lithographic) printing. Besides being useful as an ink, the vehicle of this invention may be used without pigment to provide a clear glossy over-print varnish.

Briefly stated, the ink vehicle of this invention comprises a finely divided film-forming polyvinyl chloride resin dispersed in a liquid plasticizer, a binder material to prevent "flying" (i.e., centrifugal throwing) of the ink from the rolls and to promote transfer of the ink to the paper, and surface active agents or stabilizers as required.

Common oil-type ink vehicles are essentially mixtures of oleoresinous varnishes( notably those based on linseed oil), dryers, oils, frequently waxy or greasy compounds and, optionally, other modifiers in small percentages. Heat-set inks are preferred in many instances because of their good gloss, rapid drying (as compared with other conventional inks) and because of their ability to be applied to non-absorbent stock with reduced danger of ink set-off between adjacent sheets after printing. Immediately after being printed, heat is applied to heat-set inks to drive off the solvent to bring about initial drying. The drying, however, is not complete at this stage. A subsequent hardening of the drying oil by oxidation and/or polymerization takes place over an extended period of time succeeding heating. Thus, prior art heat-set inks can be smudged until the second stage of drying is complete. In many instances, paper stock printed with conventional heat-set inks must be set aside to await complete drying before further operations such as folding, cutting, pasting, etc. can be performed. The ink vehicle of this invention achieves maximum hardness immediately upon being fused by heat and will undergo no further drying, oxidation, or polymerization. Immediately after being fused, this vehicle attains maximum smudge resistance and may immediately be further processed.

The problem of fast drying in the case of prior heat-set inks is further complicated by the requirement for press stability. That is, if a fast (volatile) solvent is used, the initial smudge resistance after fusion is better than if a slower solvent is used, but as a consequence, the ink becomes less stable on the press. The instability is due to the evaporation of solvent caused largely by the splitting of the ink film as it passes between the rolls. This evaporation of solvent converts the film of ink of the printing rolls and on the surface of the fountain to a hard gummy mass. Furthermore, the evaporation of solvent alters the rheological properties and consequently the printing characteristics of the ink. Thus the pressman is continually confronted with the problem of having to doctor the ink by the addition of solvent, in an attempt to correct for this inherent instability. Often during a production run, the hard cake of dried ink of the plates begins to interfere with the quality of the printing, particularly where fine halftone work is involved, and it becomes necessary to stop the press and clean off all the rolls and place a fresh supply of ink in the fountain. Not only is this procedure wasteful of ink, but in actual cases, the cleaning of dried ink from rolls and fountains results in an appreciable loss of production time.

Polyvinyl chloride dispersions or plastisols are well known and comprise basically a finely divided polyvinyl chloride resin dispersed in a liquid plasticizer which is used to give the mixture a fluid consistency before being fused and also to make the final product softer and more flexible. When this dispersion is heated to the appropriate temperature, the plasticizer is absorbed by the vinyl resin causing the resin particles to swell and fuse together. The result is a tough plastic mass which will never return to its original form. I am aware that plastisols have been suggested for use as ink vehicles, but to the best of my knowledge, no plastisol composition has been successfully used as a printing ink vehicle and actually been made to run on a printing press. I have found that an ordinary plastisol cannot be used for a printing ink vehicle because it is too oily and will not transfer from one ink roll to another, will fly off the rolls from centrifugal force, a phenomenon hereinafter referred to as "flying," and will not transfer satisfactorily to the paper. I also found that prior plastisol compositions are too viscous to be run on a press and whereas many plastisols exhibit an increasing viscosity with increased shear (dilatancy) it is preferred that the printing ink vehicle herein disclosed exhibit a decreasing viscosity with increased shear (thixotropy). Typical plastisol compositions consisting, for example, of mixtures of dioctyl phthalate and a suitable polyvinyl chloride dispersion resin (such as Vinylite QYNV manufactured by Union Carbide and Carbon Corporation) were made up in various proportions but none of these mixtures would transfer satisfactorily between rolls or from the rolls to the paper. Furthermore, the addition of pigment in suitable concentrations caused viscosity to become so great that printing was impossible. If the vinyl component was reduced in amount, the fused material was tacky and overplasticized. When a small amount of this mixture was applied to the paper, adhesion of the fused film to the paper was very poor and the surface of the film did not level well, giving it an orange peel surface.

It is one object of this invention to provide an ink vehicle which contains no volatile solvents and which will have press and shelf stability for over one year and will not skim over in containers.

It is another object of this invention to provide an ink vehicle which will not set-up or harden while on the rolls and may thus be washed off very easily.

It is another object to provide an ink vehicle which will fuse instantly and completely on the printing press through the application of heat alone.

It is another object of this invention to provide an ink vehicle which is glossy after being printed on the surface and fused.

It is another object of this invention to provide a plastisol-based vehicle which will fuse at a temperature below that which causes degradation of the paper stock.

It is another object of this invention to provide a heat-set ink vehicle which attains maximum rub-resistance immediately upon fusion.

It is still another object of this invention to provide a plastisol printing ink vehicle which will run on a printing press and transfer to the paper satisfactorily.

It is a further object of this invention to provide an ink vehicle wherein the fused film has good adhesion to a variety of surfaces including paper, plastic film and foil.

It is a still further object to provide an ink for aluminum foil and other non-absorbent stocks which will not set-off, even under pressures found in rewound rolls, as produced by a web fed press.

Other objects will appear hereinafter.

According to the present invention, these objects are accomplished by means of a composition comprising a dispersion of a finely divided film-forming polyvinyl chloride resin in liquid plasticizers and a binder to increase the cohesion and tack of the composition.

The preferred binder materials comprise normally solid thermoplastic resins. I have discovered that the use of a binder or cohesion-increasing agent in the composition makes it possible for a polyvinyl chloride dispersion to pass through an ink mill, to transfer from one press roll to another without flying and to transfer to and adhere to paper satisfactorily. Plastisol compositions, not including a cohesion-increasing and tackifying material were found to be wholly inoperative for lithographic or letterpress printing. The addition of cohesive agents herein disclosed in the proper concentration will render inks printable without increasing the viscosity excessively, as would be expected.

In general, any finely divided polyvinyl chloride dispersion resin may be used as the film forming resin in this invention, but it is preferred that the resins used have an average ultimate particle size on the order of about 0.1 to 1 micron and have relatively low solvating characteristics to aid in prolonging the shelf life of the ink. It is also preferred that those dispersion resins which provide a relatively low plastisol viscosity be used.

Because it is difficult to achieve the desired flow characteristics, shelf life, plasticizing action and optimum fusion temperature with a single component plasticizer, it is preferred that several components be used in combination to provide a plasticizer having qualities intermediate those of the separate component plasticizers of the vehicle formulation. Plasticizers used in combination in the order of decreasing solvating power are referred to as primary, secondary, and tertiary plasticizers. While the composition is not critical in respect to the plasticizer used, in the sense that any of many compatible vinyl plasticizers may be used in combination, their proportions must be balanced to give the correct properties before and after fusion. According to this invention, the plasticizer used produces special aging, viscosity, flexibility, and fusion temperature characteristics which are never achieved in common plastisols and are of necessity in the printing ink vehicle herein disclosed.

One preferred class of primary plasticizers are substituted phthalates, particularly di-butoxyethyl phthalate. Another preferred class of primary plasticizers are acrylates of a liquid polyethylene glycol and particularly polyethylene glycol dimethacrylate. The primary plasticizer is usually used in the amount of about 45% to 70% by weight of the vinyl resin. Excessive amounts of primary plasticizer in proportion to the other plasticizers result in greater solvation of the vinyl resin, reduced shelf life and over-plasticization of the fused film. Too little of the primary plasticizer as a percentage of the total plasticizer results in an excessively high fusion temperature and reduction in elasticity of the fused film. Because the vinyl resin is solvated under room temperature conditions predominantly by the primary plasticizers, an increase in the percentage of the primary plasticizer based on the total amount of plasticizer will often increase the viscosity of the dispersion during storage, which is, of course, undesirable.

Among the preferred secondary plasticizers are monomeric epoxy plasticizers and epoxidized vegetable oils. One epoxidized vegetable oil suitable for use in this invention is epoxidized soyabean oil having an approximate molecular weight of 1,000 and with about 6% epoxy oxygen by weight. The secondary plasticizer is usually used in amounts about equal to the primary plasticizer by weight. The secondary plasticizers are solvation-reducing plasticizers so that one will obtain less solvation with a greater proportion of the secondary plasticizer and therefore a lower viscosity will result. Lesser proportions will also shorten shelf life and reduce fusion temperature.

Among the preferred tertiary plasticizers are naphthenic hydrocarbon liquids having a boiling point from 200° to 400° C., particularly a product sold under the trademark Golden Bear Light Process Oil by the Golden Bear Oil Company of Los Angeles, California, which is a mixture of saturated and unsaturated naphthenic hydrocarbons with a boiling point of about 300° C. Other preferred tertiary plasticizers include halogenated polyphenyl liquids, particularly polychlorinated polyphenyls and butyl stearate. Tertiary plasticizers, like secondary plasticizers, in increasing proportions of the total plasticizer decrease viscosity and lower film strength and in lesser proportions increase solvation and increase viscosity and therefore reduce the shelf life. The tertiary plasticizer may be used in the amount of about 30% to 60% by weight of the polyvinyl chloride resin. Only compatible plasticizers may be used in combination.

Compatible plasticizers other than those mentioned above may be used in combination as long as their proportions are balanced so that the properties of the finished ink fall within the ranges specified. Among those plasticizers which may be used are any of the esters of phthalic, sebacic, succinic, adipic, oleic, caprylic, oxalic, phosphoric and like acids, including dibutyl phthalate, ethyl phthalyl ethyl glycollate, methyphthalyl ethyl glycollate, butyl phthalyl ethyl glycollate, dioctyl sebacate, dibutyl sebacate, di-n-hexylphthalate, "Carbitol" phthalate, methyl "Cellosolve" phthalate, glycol sebacate, dihexyl sebacate, diethyl succinate, dibutyl succinate, octadecyl butyl succinate, diisobutyl adipate, bis-(ethylene glycol monobutyl ether) adipate, ethylene glycol monobutylether oleate, 1,10-decamethylene glycol dicaprylate, tributyl aconitate, dilauryl oxalate, tricresyl phosphate and others.

While I have discovered that any compatible thermoplastic resin with a melting point on the order of about 50° C. to 200° C. may be used for imparting cohesion and tack to the ink vehicle, certain preferred resins are given by way of example. These include acrylic resins, such as polymerized n-butyl methacrylate and polymerized ester derivatives of acrylic and methacrylic acid; copolymeric styrene or substituted styrene-alkyd resins, such as styrene and acrylonitrile modified alkyd resins; ketone formaldehyde thermoplastic resins; condensed ketone thermoplastic resins and thermoplastic resins polymerized from coal tar and some petroleum distillation fractions. The cohesive agent may be used in the amount of 6% to 50% by weight of the polyvinyl chloride resin depending upon its efficiency in producing cohesiveness and tack. Too little of the cohesive and tackifying agent results in flying of the ink and viscosity, in some cases, will increase with too little of this material, because the cohesion-increasing and tackifying binder tends to decrease solvation of the vinyl resin. If too little is used the ink will not transfer satisfactorily from one roll to another, causing poor results in printing and reduced milling speed during compounding and often unsatisfactory transfer of the ink to the paper. Too little will also result in unsatisfactory adhesion between the fused ink and the paper. Too much of the cohesive agent will increase the viscosity of the composition excessively and tack will be too high resulting in too fast feeding through the rolls and stringing between the rolls. Still greater amounts will cause viscosity to become excessive so that the ink will back away from the roll in the fountain and poor feeding will result. Another effect caused by excessive amounts is weakening of the fused film.

The invention is described with greater particularity with reference to certain specific examples included in Tables I and II which demonstrate various ink vehicle formulations. Unless otherwise specified, the proportions are given in parts by weight. To the vehicles listed in Table I may be added an amount of a suitable pigment to bring the total number of parts by weight to about 100. It will be apparent to those skilled in the art that different pigments will affect the flow properties of the ink differently. Thus some pigments may be used in higher concentrations than others. I have found that if the amount of pigment added does not cause the specific gravity of the ink to exceed about 1.35, the ink can be printed satisfactorily. When the specific gravity exceeds 1.35, the ink may transfer poorly between rolls or cake on the rolls and cause mottled printing. Without pigment, the vehicle provides a clear glossy overprint varnish. The term "ink" as used herein is meant to include clear varnishes which may be applied over printing.

dibutoxy ethyl phthalate. To this mixture was added 13 parts of a pulverized ketone formaldehyde thermoplastic resin (Mohawk Resin #85). The mixture was then heated to a temperature of 270° F. for about five minutes with slow mixing until the thermoplastic resin was dissolved. This solution was then cooled to room temperature. Next was added 2.0 parts of a surfactant comprising a mixture of primary amine derivatives of fatty acids of the type R—$NH_2$ where R is a straight chain alkyl radical of 6 to 18 carbon atoms. Then 8 parts of carbon black and 1 part phthalocyanine blue pigment were dispersed in the mixture by means of a pony mixer. Next, 35 parts of a vinyl dispersion resin (Geon 121) were added slowly with continued mixing. When the dispersion appeared smooth, it was charged into a three roll mill and passed through the mill three times with moderately tight mill settings. Cold water was run through the rolls to prevent over-heating of the ink.

TABLE I

[Footnote numbers refer to corresponding numbers in Table II]

[Parts By Weight]

| Example No. | I | II | III | IV | V | VI | VII | VIII | IX | X | XI | XII | XIII |
|---|---|---|---|---|---|---|---|---|---|---|---|---|---|
| Film forming polyvinyl chloride dispersion resin: | | | | | | | | | | | | | |
| QYNV (1) | 36 | | | | | | | | | | | | |
| Geon 121 (2) | | | | 33 | 34.4 | 35 | | | | | | | |
| Marvinol VR-50 (3) | | | 38.3 | | | | 37 | | 15 | 15 | 15 | 15 | 40 |
| Geon 126 (4) | | 32.4 | | | | | | | | | | | |
| Cohesive agent and tackifier: | | | | | | | | 30 | 15 | 15 | 15 | 15 | |
| Polymerized n-butyl methacrylate. sp. gr. 1.06, heat distortion temp. under 25° C | 2.6 | 4.0 | 3.3 | | 3 | | | | | | | | |
| Copolymeric styrene or substituted (5) styrene-alkyd resin such as styrene and acrylonitrile modified alkyd resins. Acid No. 4-8, visc. Gardner Holt at 25° C. 50% in Xylol X—Z (1) | | | | | | | | | | | | | |
| Ketone formaldehyde thermoplastic resin (6) M.P. (Ring and Ball) 115–120° C., sp. gr. 1.202, acid No. 0 | | | | | 10.1 | | | | | | | | |
| Condensed ketone thermoplastic resin (7) M.P. Mercury method 85–90° C. sp. gr. 1.1–1.2, acid No. 0 | | | | 13 | | 13 | 13 | | | | | | |
| Brittle high M.W. thermoplastic resin (8) polymerized from coal tar and some petroleum distillation fractions. Softening point ASTM E28 117° C., sp. gr. 1.04–1.06 | | | | | | | | | 14.0 | | 14 | | 14 | 14 |
| Solid polymerized ester derivatives of acrylic (9) acid and methacrylic acid. Softening range 70-80° C. capillary tube, sp. gr. 1.07 | | | | | | | | | | 10 | | | |
| Plasticizer: | | | | | | | | | | | | | |
| Polychlorinated polyphenyl liquid (10) pour point ASTM D97 19.4° F., visc. 100° F. 184-240 SUS, sp. gr. 25° C. 1.445 | 24.7 | 11.5 | 10.2 | 12.8 | 12.2 | 10.3 | 12.7 | | | | 3.0 | | |
| Dimethacrylate of a liquid polyethylene glycol | | 29.6 | 16.4 | | 14.1 | | | | | | | | |
| Epoxidized soyabean oil-M.W. approx. 1,000, percent of epoxy oxygen 6% by weight | 24.7 | 11.5 | 10.2 | 12.8 | 12.2 | 10.3 | 12.7 | 13 | 18.4 | | 20.7 | 16.5 | 17.7 |
| Butyl stearate | | | | | 3 | | | | | | | | |
| Dibutoxyethyl phthalate | | | | 18.4 | | 14.4 | 18.1 | 14 | 19.7 | 15.2 | 22.2 | 17.7 | 18.9 |
| Mixtures of saturated and unsaturated napthenic hydrocarbon liquids (11), visc. at 25° C. 40–100 CP, B.P. 300° C., sp. gr. 0.95–0.97 | | | | | | | | 7 | 9.9 | 7.6 | 11.1 | 8.8 | 9.4 |
| Monomeric epoxy plasticizer (12), acid number mgm. KOH/gm. 1.0 max., sp. gr. at 25° C. 9180, freezing point 19° F | | | | | | | | | | 14.2 | | | |

TABLE II

| | | | |
|---|---|---|---|
| (1) | QYNV | Bakelite Div. of Union Carbide & Carbon Corp. | N.Y., N.Y. |
| (2) | Geon 121 | B. F. Goodrich Chemical Co. | Cleveland, Ohio. |
| (3) | Marvinol VR 50 | Naugatuck Div. of U. S. Rubber Co. | Naugatuck, Conn. |
| (4) | Geon 126 | B. F. Goodrich Chemical Co. | Cleveland, Ohio. |
| (5) | Cycopol 320-5 | American Cyanamid Co. | N.Y. 20, N.Y. |
| (6) | Mohawk Resin #85 | Mohawk Industries Inc. | N.Y. 5, N.Y. |
| (7) | Mohawk Resin #77 | do | Do. |
| (8) | Piccoflex 120 | Pennsylvania Industrial Chem. Co. | |
| (9) | Acryloid B-82 | Rohm & Haas | Philadelphia, Pa. |
| (10) | Aroclor 1248 | Monsanto Chemicals Co. | St. Louis, Missouri. |
| (11) | Light Process Oil | Golden Bear Oil Co. | Los Angeles, Calif. |
| (12) | Monoplex S-73 | Rohm & Haas | Philadelphia, Pa. |

Example XIV

The plasticizer was compounded by mixing together 12.7 parts of a polychlorinated polyphenyl liquid plasticizer (Aroclor 1248), 12.7 parts epoxidized soyabean oil (M.W. 1000, 6% epoxy oxygen by weight) and 18.1 parts The ink was printed with a web fed offset rotary press making 200 impressions per minute onto bleached calendared kraft paper and fused with a gas flame drying oven maintained at an inside temperature of 400° F. The ink transferred very well from one roll to another and from the rolls to the paper. Little flying was experienced. Adhesion to the paper was satisfactory. Immediately upon emerging from the oven the scuff and smudge resistance of the ink was superior to all heat-set inks I have seen as judged by standard tests. The ink was left in the fountain and on the rolls overnight and the next day printing was continued with no wash-up using the same ink. No change in the consistency or printing properties of the ink were noticed the next day. The same ink was printed for several hours using a half tone plate and showed no change in dot fidelity or tendency to bridge between dots or to become gummy, which is characteristic of most heat-set inks after running for several hours. After storage in a can for one year, the ink had undergone no apparent change in consistency.

To the compositions given by way of example in Table I may be added any one of a number of surface active agents known to the art to reduce the viscosity of the ink vehicles. One suitable surface active agent is a mixture of primary amine derivatives of fatty acids of the type R—NH$_2$ where R is a straight chain alkyl radical of 6 to 18 carbon atoms.

The fusion temperature of the ink must be maintained within certain limits. Most important, it must not be so high that the paper will be adversely affected by the heat. Lower limits are set by the fusion temperature of the particular resin and plasticizer combination. However, the fusion temperature is affected to some extent by all of the ingredients in the composition. While a plastisol will gel upon moderate heating to form a mass having little mechanical strength, optimum physical properties are obtained only by heating the composition above the fusion point. Fusion temperatures must be within the limits set by the ability of ovens, the duration of the heating and the ability of the paper to tolerate heat. In general, to raise the fusion temperature of the composition, lesser amounts of high solvating plasticizers are used and to lower the fusion temperature, greater amounts are used.

It is one object of this invention to provide good gloss in the finished ink. Generally an increase in plasticizer content increases gloss. Vinyl resins having lower intrinsic viscosities also produce better gloss. Pigments, of course, can influence gloss and generally increasing amounts of pigment reduce gloss. Certain resins disclosed herein which serve primarily to increase cohesiveness and tack may also be used to increase gloss. Vehicles with higher fusion temperatures generally have better gloss than those with lower fusion temperatures.

Adhesion of an ordinary plastisol composition to paper stock is not sufficient to allow it to be used as an ink vehicle. I discovered that two mechanisms could be used to provide sufficient adhesion. The first method is by promoting plasticizer absorption into the paper stock which causes the bonding of the ink to the paper mechanically. The second method is by use of a tackifying resin. Both methods may be used simultaneously, i.e., an adhesion-promoting plasticizer-soluble resin compatible with the polyvinyl chloride resin may be dissolved in a plasticizer combination which has a strong tendency to penetrate the paper stock. Alternatively, the two methods may be used separately.

The rheological properties of the printing ink vehicle including tack must be such that the ink will not fly from the roll but yet will transfer to the paper. This invention provides means whereby these and other ends may be accomplished. The rheological properties of the ink, of course, are affected by many factors such as the type of plasticizer used, its concentration, the vinyl resin used and by the addition of surfactants or the concentration and type of pigment. It was discovered, however, that the use of a cohesive and tackifying agent as disclosed in this invention, made the difference between a vehicle which could be used on a printing press and one which could not. Dilatancy is not generally desirable because it reduces the feeding of the ink onto the rolls at high printing speeds and produces a mottled effect in the fused film. Extreme thixotropy is is not desirable either because the link will back away from the rolls, causing poor feed, stringing between rolls and an orange peel condition in the fused film.

Any of the common ink pigments may be used with the vehicle herein disclosed except iron-containing pigments which cause the vehicle to gel and then harden to a solid material during storage.

In formulating the compositions herein disclosed, a particular series of steps is preferred in order to produce the best results. First the resinous cohesion-imparting binder is melted into the plasticizer mixture to make a varnish by sifting the resin into the freshly heated plasticizer. Heating is continued until the cohesive agent is dissolved. Excessive heating should be avoided because it degrades the resin and sometimes results in a darkening of the varnish. The mixture is then cooled. At this point a surfactant may be added if desired. To this mixture is added any desired pigment which is dispersed with a pony or change-can mixer. Then vinyl resin is sifted slowly into the plasticizer in order to avoid the formation of lumps and to prevent over-heating. The mixer may have to be cooled during this operation in order to prevent the solvation of the vinyl resin by mechanically induced local over-heating. When the composition becomes smooth, it may be milled on a three roll mill to produce a better dispersion. Here again, the rolls must be cooled to avoid solvation of the vinyl resin. The ink may be passed as many times as necessary through the mill in order to obtain a good dispersion. This is usually accomplished in about 2 to 4 passes through the mill. Excessive milling or running with the rolls too tight will cause burning or solvation of the composition. Some of the plasticizer may be held out of the mixture in order to increase the viscosity of the composition during milling and can be added at this time.

It is not a common practice to mill plastisols due to the fact that in many cases milling causes unwanted solvation of the vinyl resin to occur. In the case of the ink vehicle herein disclosed, milling is advantageous because it produces a more homogeneous product. Then too, solvation is low due to the low solvating character of the plasticizers used. Even so, milling must be done with care, mill settings should not be over tight and cooling water must be passed through the mill at all times. While the preferred method of formulating the ink has been described, other methods may be used if desired. I do not limit the formulation of the composition to the particular method described.

Printing machinery and techniques for printing the inks herein disclosed are similar to those for other heat-set inks. The oven used, must, of course, heat the ink above its fusion point in order to obtain satisfactory physical properties. In most cases the oven temperature necessary to fuse the ink is between 400° and 500° F. The paper is exposed to this temperature for the duration of a few seconds. A heating oven of any adaptable type may be used.

The ink vehicle herein disclosed produces excellent results in printing halftones. It was discovered that because of the superior press stability of the ink (it neither oxidizes nor dries by solvent evaporation) the tendency for an ordinary heat-set ink to bridge over between the dots in a halftone after extended running has been corrected.

It is important that ordinary natural rubber rolls not be used on the press when the ink herein disclosed is being run. Natural rubber and other rubbers to a less extent will absorb the plasticizers used in the vehicle. It is recommended that polyurethane rubber rolls such as those sold under the trade name "Extron" be used to avoid plasticizer absorption. Alternatively, composition rolls made of plasticized glue may be used. Ordinarily, the ink may be thinned by adding more of the vehicle or more plasticizer. The ink may be left on the press overnight or for any length of time necessary without any change in consistency, or performance.

The absence of volatile organic solvents in the ink made according to this invention is desirable but not essential. While I have disclosed ink composition which may be used without a volatile organic solvent for use where a heat-set oil-type printing ink is normally used, it may be desirable in some other printing processes to use the same composition with the addition of a volatile organic solvent to lower viscosity. While the addition of solvent (even a relatively high boiling solvent) will lower the viscosity, it will also result in decreased press stability due to the evaporation of solvent on the press, thereby defeating several of the objects of the invention. If the ink is to be stored for any substantial period of time, in instances when a volatile organic solvent is to be used, the solvent should be stirred in at the press.

Some printing processes require an ink having a viscosity between that of an oil-type ink and that of a gravure ink. In such a case, a suitable organic solvent may be added at the press to the ink vehicle herein disclosed as a means of lowering the viscosity. The solvent may be a diluent, such as mineral spirits, which would serve only to reduce the viscosity or it may be a latent solvent, such as diisobutyl ketone, which would serve not only to lower the viscosity but also to lower the fusion temperature.

Unlike ordinary ink, the heat-dry ink vehicle herein described was found to have good shelf life, even in an open container, unlimited press stability and immediate rub resistance after heating. These features are obviously of great advantage in the art and to the best of my knowledge were never before achieved or even approached by any other ink composition. These highly desirable features of the ink derive from the fact that I have made the inclusion of solvent in printing inks unnecessary. These inks are stable in shipping containers for more than one year, will fuse below the decomposition point of paper and are printable on a rotary press making 200 or more impressions per minute. They have exhibited good transfer between rolls and on to the paper stock without flying or stringing.

While I have disclosed certain preferred manners of performing my invention, I do not desire or intend to limit myself solely thereto, for the precise proportions of the materials utilized may be varied and equivalent chemical materials may be employed if desired without departing from the spirit and scope of the invention as defined in the appended claims.

I claim:

1. A stable, volatile solvent-free, heat-dry printing ink vehicle for letterpress or offset printing comprising a finely divided polyvinyl chloride resin having an average particle size between about 0.1 micron to 1 micron dispersed in a compatible non-volatile non-solvent liquid plasticizer, said plasticizer including a mixture of at least two non-volatile plasticizers of different solvating properties, one present in amounts from about 45 to 70 parts by weight for each 100 parts by weight of polyvinyl chloride resin selected from the group consisting of alkyl and alkoxy phthalates, polyethylene glycol acrylates and esters of sebacic, succinic, adipic, oleic, caprylic, oxalic and phosphoric acids, and another present in amounts from about 45 to 70 parts by weight for each 100 parts by weight of polyvinyl chloride resin selected from the group consisting of monomeric epoxy plasticizers and epoxidized vegetable oils; and a compatible thermoplastic resinous cohesive-increasing and tackifying binder material present in amounts from about 6 to 50 parts by weight for each 100 parts of polyvinyl chloride resin and selected from the group consisting of acrylic resins, hydrocarbon resins polymerized from coal tar and petroleum distillation fractions, ketone resins, ketone formaldehyde resins, styrene copolymers and styrene-alkyd resins, the rheological properties of said vehicle being such that the ink will adhere to printing rolls without flying and will transfer from one roll to another and onto the printing stock, said vehicle being fusible to a tough film at a temperature below the degradation temperature of paper.

2. A printing ink vehicle according to claim 1 further characterized in that said plasticizer also includes from about 30 to 60 parts by weight for each 100 parts of polyvinyl chloride resin of a plasticizer selected from the group consisting of naphthenic hydrocarbon liquids having boiling points between about 200° and 400° C., halogenated polyphenyl liquids and butyl stearate.

3. A printing ink vehicle according to claim 1 further characterized in that coloring pigment is incorporated and uniformly distributed throughout said vehicle in amounts to produce an ink having a specific gravity of less than about 1.35.

4. A stable, volatile solvent-free, heat-dry printing ink vehicle for letterpress or offset printing comprising a finely divided polyvinyl chloride resin having an average particle size between about 0.1 micron to 1 micron dispersed in a compatible non-volatile non-solvent liquid plasticizer, said plasticizer being present in amounts from about 50 to 180 parts by weight for each 100 parts of polyvinyl chloride resin and including a mixture of at least two non-volatile plasticizers of different solvating properties selected from (1) group consisting of alkyl and alkoxy phthalates, polyethylene glycol acrylates and esters of sebacic, succinic, adipic, oleic, caprylic, oxalic and phosphoric acids; (2) group consisting of monomeric epoxy plasticizers and epoxidized vegetable oils; and (3) group consisting of naphthenic hydrocarbon liquids having boiling points between about 200° and 400° C., halogenated polyphenol liquids and butyl stearate; and a compatible thermoplastic resinous cohesive-increasing and tackifying binder material present in amounts from about 6 to 50 parts by weight for each 100 parts of polyvinyl chloride resin and selected from the group consisting of acrylic resins, hydrocarbon resins polymerized from coal tar and petroleum distillation fractions, ketone resins, ketone formaldehyde resins, styrene copolymers and styrene-alkyd resins, the rheological properties of said vehicle being such that the ink will adhere to printing rolls without flying and will transfer from one roll to another and unto the printing stock, said vehicle being fusible to a tough film at a temperature below the degradation temperature of paper.

5. A printing ink vehicle according to claim 4 further characterized in that said surface-active agent is a primary amine derivative of a fatty acid of the type $RNH_2$ where R is a straight chain alkyl radical of from about 6 to 18 carbon atoms.

References Cited in the file of this patent

UNITED STATES PATENTS

| | | |
|---|---|---|
| 2,254,072 | Jenkins | Aug. 26, 1941 |
| 2,450,435 | McGillicuddy | Oct. 5, 1948 |
| 2,857,349 | Greenspan et al. | Oct. 21, 1958 |

FOREIGN PATENTS

| | | |
|---|---|---|
| 707,381 | Great Britain | Apr. 14, 1954 |